April 21, 1959     T. D. McCALL     2,883,661

PULSE RADAR SIMULATOR

Filed Nov. 5, 1957

INVENTOR
THOMAS D. McCALL

United States Patent Office 2,883,661
Patented Apr. 21, 1959

2,883,661

PULSE RADAR SIMULATOR

Thomas D. McCall, Silver Spring, Md., assignor to the United States of America as represented by the Secretary of the Army Application November 5, 1957, Serial No. 694,688

3 Claims. (Cl. 343—17.7)

(Granted under Title 35, U.S. Code (1952), sec. 266)

The invention described herein may be manufactured and used by or for the Government for governmental purposes without the payment to me of any royalty thereon.

This invention relates to means and methods for evaluating and testing pulse radar systems. More particularly, this invention relates to means and methods for simulating the received pulses that would be obtained for various target approaches in a pulse radar system. A device of this type may be advantageously used for laboratory and production evaluation of radar equipment and other types of related pulse radar systems, such as altimeters.

An obvious way of simulating a target at a predetermined distance is to provide simulated received pulses which are delayed from the transmitted pulses by an amount corresponding to target distance. A simulation of target approach may then be accomplished by progressively decreasing the amount of the delay of the simulated received pulses from the transmitted pulses. The speed at which this is done is proportional to the velocity of the approach of the target.

In the prior art, the simulation of target approach using the simulated-delayed pulse technique described above is accomplished by varying the delay of the simulated received pulses either manually or mechanically by motor-driven potentiometers. Such a manual or mechanical system is not only costly and bulky, but because of the moving parts involved, is prone to frequent breakdowns. In the present invention, an improved simulation system of this type is provided in which target approach is simulated by electronic means so that no moving parts are required. The result is a cheaper, smaller, and more reliable pulse radar simulation device.

It is an object of this invention, therefore, to provide improved means and methods for testing and evaluating pulse radar systems.

Another object of this invention is to provide an electronically operated pulse radar simulation device having no moving parts.

In a preferred embodiment of the invention, a simulation of target approach is accomplished by a novel arrangement of two phantastron circuits and associated electronic circuitry whereby the simulated delay produced by one phantastron circuit is linearly varied by means of the other phantastron circuit. Utilizing such means, a wide range of target distances and target approach velocities are simulated.

The specific nature of the invention, as well as other objects, uses and advantages thereof, will clearly appear from the following description and from the accompanying drawing, in which.

Figure 1:
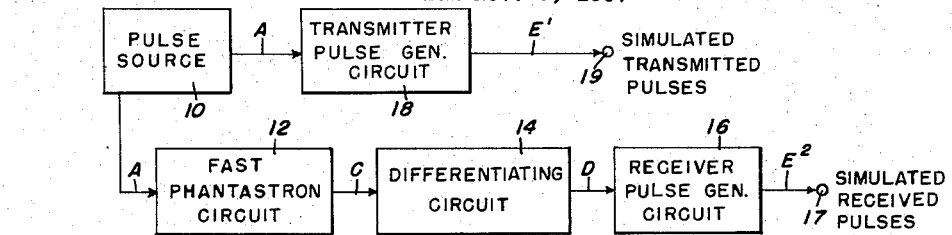
Figure 1 is a block diagram representation of a simulated pulse radar device in accordance with the invention.
Figure 2:
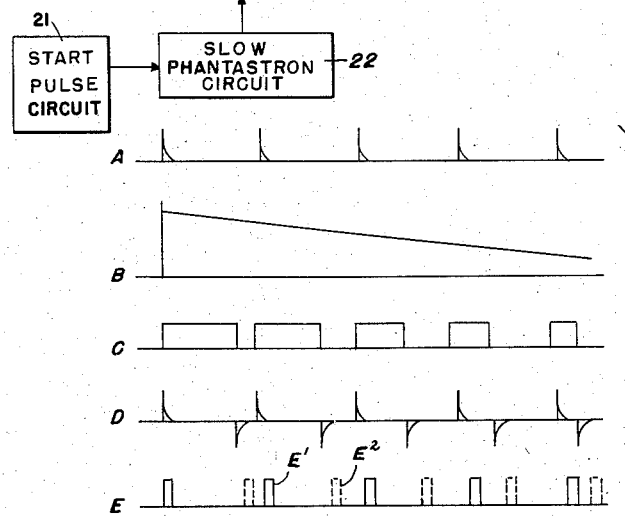
Figure 2 is a graph showing the waveforms at various points in the block diagram of Figure 1.

In Figure 1, a pulse source 10 having a waveform which may be as in A of Figure 2, is used to drive a transmitter pulse generator circuit 18 and a fast phantastron circuit 12. The pulse source 10 may be a pulse generator or, if so desired, may be the detected pulses from a radar transmitter. The transmitter pulse generator circuit 18 may be adapted to provide simulated transmitted pulses at the terminal 19 of a desired width, such as shown by E' in Figure 2. Alternatively, the pulses of the pulse source 10 may be used as transmitter pulses.

The fast phantastron circuit 12 is of the conventional type which uses a pentode tube and may be adapted to provide rectangular pulses at the pentode cathode having a pulse width which is proportional to the voltage on the plate of the pentode tube. Such pulses are shown at C of Figure 2. The rectangular pulses of the fast phantastron circuit 12 are triggered by pulses from the pulse source 10.

The voltage on the plate of the pentode of the fast phantastron circuit 12 is controlled by means of a slow phantastron circuit 22 and an isolating cathode follower 20. The slow phantastron circuit 22 is also of the conventional type and may be triggered by any conventional pulse source, such as represented by the start pulse circuit 21. As is well known of phantastron circuits, a linear falling voltage appears upon the plate of the phantastron pentode after the circuit is triggered. This linear falling voltage of the slow phantastron circuit 22, as illustrated by B of Figure 2, is used to provide the plate voltage for the fast phantastron circuit 12. The cathode follower 20 provides isolation between the two phantastron circuits 12 and 22. The terms "slow" and "fast," given to the phantastron circuits 22 and 12 respectively, are used to indicate that the rundown time of the slow phantastron circuit 22 is very much slower than the rundown time of the fast phantastron circuit 12 which is periodically triggered by the pulse source 10. The slow phantastron circuit 22 may be triggered by a start pulse in a conventional manner to initiate the relatively slow rundown of the place voltage as shown by B. The slow phantastron circuit 22 may be made to start manually, or if so desired, may be adapted to cycle periodically by suitable means. Pages 195–204 of volume 19 of the Radiation Laboratory Series gives some general information on various conventional phantastron circuits.

The pulses from the cathode of the past phantastron circuit 12 are fed to a differentiating circuit 14 which produces pulses as shown at D in Figure 2. These differentiated pulses are then fed to a receiver pulse generator circuit 16 which is responsive only to negative pulses. This receiver pulse generator circuit 16 is adapted to produce simulated received pulses having a desired width at the terminal 17. These pulses are shown dashed as $E^2$ in Figure 2.

The operation of the radar pulse simulation device of Figure 1 may be explained with reference to the waveforms of Figure 2. To simulate a target approach, the rundown of the voltage of the slow phantastron circuit 22 is initiated either manually using a push button, or automatically if the phantastron circuit 22 is cycling periodically. Each pulse from the pulse source 10 initiates a cycle of the fast phantastron circuit 12, the width of the pulses produced being dependent upon the voltage on the plate of the fast phantastron pentode. As shown at B and C in Figure 2, the width of the pulses produced by the fast phantastron circuit 12 decreases as the plate voltage of the slow phantastron circuit 22 runs down. The trailing edge of these fast phantastron pulses are used to produce simulated received pulses by means of the differentiating circuit 14 and the receiver pulse generator circuit 16, as explained previously. The graph E in Figure 2 illustrates how the time delay between the simulated transmitted and received pulses decreases as the plate voltage of the slow phantastron circuit 22 runs down. This is equivalent to a simulated target approach.

Figure 3:
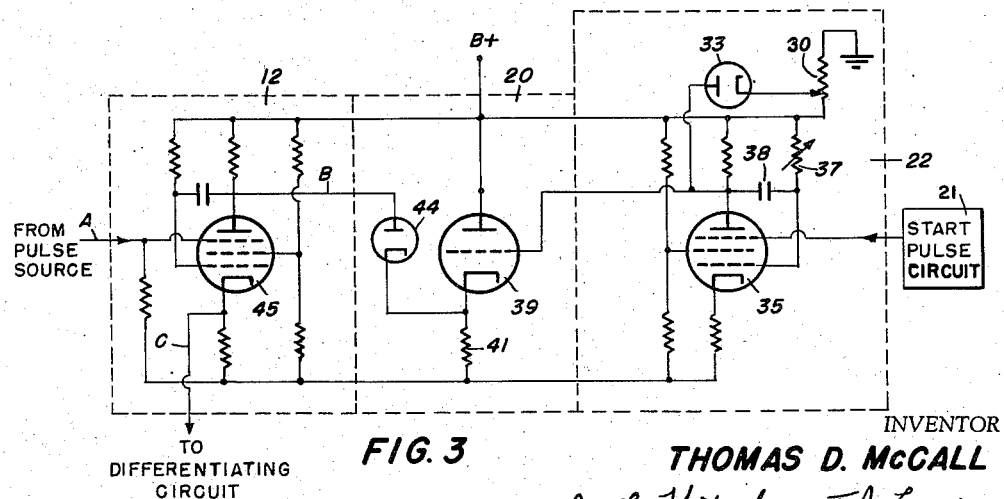
Figure 3 is a circuit diagram showing a specific embodiment of a portion of Figure 1.

Figure 3 is an example of specific circuits which may be used for the fast phantastron circuit 12, the slow phantastron circuit 22, and the isolating cathode follower 20.

The potentiometer 30 in the slow phantastron circuit 22 is used to set the plate voltage of the phantastron pentode 35. The potentiometer 30, therefore, may serve to set an initial time delay for the simulated received pulses. This time delay corresponds to a particular target distance. The diode 33 disconnects the pentode plate from the voltage set by the potentiometer 33 so as to permit the plate voltage to rundown as in conventional phantastron operation. This rundown of the slow phantastron circuit 22 is initiated by a start pulse applied to the suppressor grid of the pentode 35. As in the conventional phantastron circuit, the rundown time will substantially be determined by the time constant of the resistor 37 and the capacitor 38. By making the resistor 37 variable, therefore, a velocity of approach adjustment is obtained.

The rundown voltage on the plate of the pentode 35 is applied to an isolating cathode follower 20 which comprises a triode 39 with a resistor 41 in the cathode circuit and the plate connected to B+. The cathode of the triode 39 follows the rundown of the slow phantastron plate voltage. The plate of the pentode 45 of the fast phantastron circuit 12 is connected to the cathode of the cathode follower 20 through a diode 44. The diode 44 serves the same function as the diode 33 and disconnects the cathode voltage during the rundown of the fast phantastron circuit 12. Pulses from the pulse source 10 trigger the fast phantastron circuit producing pulses at the cathode of the pentode 45, the width of these pulses being determined by the plate voltage on the pentode 45 at triggering. This plate voltage will be the cathode voltage of the triode 39 which follows the rundown of the plate voltage of the slow phantastron circuit 22.

At the end of the rundown of the slow phantastron circuit 22, and after the plate of the pentode 35 returns to the value set by the potentiometer 30, the slow phantastron rundown may be initiated again manually by a push button, or may be made to rundown periodically by connecting the suppressor grid of the pentode 35 to the pulse source 10 by suitable means.

In the particular circuit shown in Figure 3, adjustment of the potentiometer 30 controls the simulated initial target distance setting, and adjustment of the variable resistor 37 controls the simulated velocity of target approach. Equivalent controls may also be provided and various refinements are possible within the scope of the invention.

It will be apparent that the embodiments shown are only exemplary and that various modifications can be made in construction and arrangement within the scope of the invention as defined in the appended claims.

I claim as my invention:

1. A pulse radar simulation device comprising in combination: a pulse source; a first phantastron circuit having a first pentode tube adapted for phantastron operation, said first pentode tube having at least plate, cathode, control grid, screen grid, and suppressor grid elements, the rundown time of the voltage on the plate of said first pentode tube being relatively fast, said rundown time being determined by the voltage on said plate at triggering, said first phantastron being triggered by pulses from said pulse source; means connected to said first phantastron circuit for producing simulated received pulses delayed in time from the pulses of said pulse source by an amount proportional to the rundown time of said first phantastron circuit; a second phantastron circuit having a second pentode tube adapted for phantastron operation, said second pentode tube having at least plate, cathode, control grid, screen grid, and suppressor grid elements, the rundown time of the voltage on the plate of the second pentode being relatively slow with respect to the rundown time of the voltage on the plate of the first pentode; an isolating cathode follower, the input of said cathode follower being connected to the plate of said second cathode; a diode having plate and cathode elements, the plate of said diode being connected to the plate of said first pentode, and the cathode of said diode being connected to the output of said cathode follower; and means for triggering said second phantastron circuit.

2. The invention in accordance with claim 1 wherein said means for producing simulated received pulses comprises: a differentiating circuit having its input connected to the cathode of said first pentode, and a pulse generator circuit connected to the output of said differentiating circuit, said pulse generator being responsive only to negative pulses.

3. The invention in accordance with claim 2, there being additionally provided: means connected to said second phantastron circuit for adjusting the initial plate voltage of said second pentode and the rundown time of said second phantastron circuit.

References Cited in the file of this patent

UNITED STATES PATENTS 2,447,485    Jacob                 July 26, 1949